United States Patent [19]
Toji

[11] Patent Number: 5,694,168
[45] Date of Patent: Dec. 2, 1997

[54] AUTO FOCUS CONTROL DEVICE AND METHOD INCLUDING SELECTING A ZONE FOR DETECTING AN EVALUATIVE VALUE FOR FOCUSING IN ACCORDANCE WITH PHOTOGRAPHING DIRECTION

[75] Inventor: Shigeo Toji, Tokyo, Japan

[73] Assignee: Fuji Photo Film Co., Ltd., Kanagawa, Japan

[21] Appl. No.: 692,155

[22] Filed: Aug. 5, 1996

Related U.S. Application Data

[63] Continuation of Ser. No. 543,347, Oct. 16, 1995, abandoned, which is a continuation of Ser. No. 283,151, Aug. 3, 1994, abandoned, which is a continuation of Ser. No. 941,152, Sep. 4, 1992, abandoned.

[30] Foreign Application Priority Data

Sep. 4, 1991 [JP] Japan ................................. 3-224440

[51] Int. Cl.[6] .................. G03B 13/00; G03B 17/00; H04N 5/232; H04N 5/238
[52] U.S. Cl. .................. 348/350; 348/365; 348/366; 348/354; 348/356; 396/98; 396/124; 396/155
[58] Field of Search .................. 348/229, 254, 348/365, 347, 366, 345, 362, 207, 227, 350, 348, 353, 354, 356; 396/79, 89, 98, 121, 123, 124, 155

[56] References Cited

U.S. PATENT DOCUMENTS

| | | | |
|---|---|---|---|
| 4,969,045 | 11/1990 | Haruki et al. | 348/229 |
| 5,061,954 | 10/1991 | Toyama et al. | 354/402 |
| 5,144,450 | 9/1992 | Kikuchi et al. | 348/347 |
| 5,184,172 | 2/1993 | Miyazaki | 354/432 |

*Primary Examiner*—Leo Boudreau
*Assistant Examiner*—Bipin Shalwala

[57] ABSTRACT

A zone for measuring distance is enlarged by adding an area where a contrast ratio is relatively high in the case of the photographing against the light. Thus, the sensitivity for judging a contrast ratio is increased and improper focusing is prevented. The brightness when an evaluative value is a maximum and the brightness at a moment when the evaluative value is not at maximum, for example when it is at a minimum, are compared. If the difference of brightness becomes too large, the maximum evaluative value is ignored and the detection is repeated. The determination of when the difference in brightness is too large is made to be dependent on parameters such as gain of the AGC circuit, gain of the amplifier and iris opening which affect the noise in the evaluative value so as to more accurately judge when the when the maximum evaluative value should be ignored.

16 Claims, 15 Drawing Sheets

ORDINARY ZONE $\left(\frac{1}{3} \times \frac{1}{3}\right)$

ENLARGED ZONE $\left(\frac{1}{2} \times \frac{1}{2}\right)$

AUTO FOCUS CONTROL DEVICE AND METHOD INCLUDING SELECTING A ZONE FOR DETECTING AN EVALUATIVE VALUE FOR FOCUSING IN ACCORDANCE WITH PHOTOGRAPHING DIRECTION

This application is a continuation of application Ser. No. 08/543,347 filed on Oct. 16, 1995, now abandoned; which is a Rule 62 Continuation of Ser. No. 08/283,151 filed Aug. 3, 1994, now abandoned; which is a Rule 62 Continuation of Ser. No. 07/941,152 filed Sep. 4, 1992, now abandoned.

BACKGROUND OF THE INVENTION

The present invention relates to a control device of an autofocus mechanism in a camera and an improvement of focusing certainly and rapidly.

In the case that a zone for measuring a distance between an object and a camera is provided at a picture plane of a camera in an auto-focus mechanism of the type using a contrast ratio method, a fixed and small zone is conventionally provided at a center portion of the picture plane. Usually a main object positioned at a center portion of the picture plane is photographed so that a focus lens member is moved axially in order to optimize the contrast ratio of a picture at the center portion of the picture plane.

However, when a picture is taken against the light, generally the contrast ratio is greatly reduced at the center portion of the picture. It thus becomes difficult to find an optimum contrast in the case of a conventional zone for measuring the distance and thus the auto focusing adjustment is often wrong.

In the case of an auto-focus mechanism of the type using a high frequency detecting method (which is also a contrast method), an output of a picture image passes through an automatic gain control (AGC) circuit and a high frequency part of a signal of a picture image obtained from the automatic gain control circuit (hereinafter, referred to as a ("high frequency part") is picked up by passing the image through a bandpass filter. The picked-up high frequency part is detected in order to detect an evaluative value for focusing (hereinafter, referred to as "an evaluative value"), and a proper focus position of a lens member where the evaluative value becomes peak is determined. That is, when focusing is proper, the contrast ratio is maximum and the high frequency part also is maximum. In such cases, one kind of a bandpass filter is utilized. Usually, a circuit for amplifying by a fixed gain value is provided at a wave detector circuit in order to increase the sensitivity for picking up the high frequency part. In addition, it is judged whether a peak is reached when the evaluative value is going down after the evaluative value has been going up. However, noise is usually included in the evaluative value. Unless the evaluative value has changed more than the noise level, it cannot be determined whether the evaluative value has actually increased or decreased. Therefore, in the conventional method, it is judged whether a displacement of an evaluative value is greater or less than a fixed reference value.

However, in a conventional auto-focus mechanism, there is only one bandpass filter. In the case of a narrow bandpass filter, if a focus lens is initially positioned far from a proper focus point, the filter output is little changed even if the focus lens is moved frontwards or backwards, since the high frequency part has an amplitude that is still small. Accordingly, the evaluative value is little changed initially so that it is very difficult to detect whether a frontward direction or a backward direction is the proper direction toward the focus point. It therefore requires much time to detect a peak of the evaluative value accurately. In the case of a broad bandpass filter, a displacement of the evaluative value is changed only slightly near the peak, so that it is difficult to detect the peak accurately.

The above described relation between focusing and the high frequency part comes into existence in the case that the brightness of an object is constant. If the brightness of an object changes while a focus lens is being moved for detecting the peak of the evaluative value, the peak is misidentified since the high frequency part itself varies with brightness.

In the case that an object is dark, the iris is further opened and the gain value of the AGC circuit becomes high. The high gain value of AGC circuit is added to the fixed gain value of an amplifier circuit. Thus the gain value in the entire system becomes very high and the noise component is also increased. If the noise component is large, it is difficult to detect a change of the evaluative value if the evaluative value is increased or decreased only a little. In such a case, the peak of an evaluative value is thus unclear and one cannot detect a proper focus position accurately. Further, the noise level is changed in accordance with the opening degree of the iris, as well as the gain value of the AGC circuit and the gain value of an amplifier for a wave detector. The following problem arises if a reference value for detecting a displacement of an evaluative value is fixed.

(1) In the case of a fixed reference value having a relatively low level, when an iris is relatively closed the gain of the AGC circuit is relatively high or the fixed gain of an amplifier is relatively high resulting in the evaluative value having increased noise. A judgement of a peak of the evaluative value becomes unclear due to this noise. As a result, the judgement is sometimes wrong.

(2) On the contrary, in the case of a fixed reference value having a relatively high level, when an iris is relatively opened the gain value the AGC circuit is relatively low or the fixed gain of an amplifier is relatively low, resulting in the evaluative value being unable to be judged until the evaluative value is much decreased, despite the noise being relatively low. That is, the peak of the evaluative value cannot be detected until a focus lens runs over a proper focus position some distance. Thus, detection of the peak is delayed.

On the other hand, recently there has been known a video camera of a rear focus lens type in which a focus lens is provided behind a zooming lens. In the rear focus lens type video camera a proper focus position of a focus lens is changed depending on the focusing distance of a zooming lens. The focus position versus focusing distance varies as a curved line.

Conventionally, it is difficult to maintain the proper focus position of a focus lens in accordance with a focus distance of a zooming lens.

OBJECT OF THE INVENTION

An object of the present invention is to resolve the above described problems, particularly, the first object of the invention is to provide an auto focus control device in an auto focus mechanism of type using a contrast method by providing a zone for measuring the object distance at a center portion of a picture plane to prevent incorrect focusing in the case of taking a picture against the light.

The second object of the present invention is to provide an auto focus control device in an auto focus mechanism of the type using a contrast method by detecting a high frequency part to prevent incorrect focusing by detecting an evaluative value at the correct focusing timing and by positioning a focus lens at a point where the evaluative value becomes maximum.

The third object of the invention is to provide an auto focus control device in an auto focus mechanism of the type using a contrast method by detecting a high frequency part to focus a dark object correctly in the case that an evaluative value is detected and a focus lens is positioned at a point where the evaluative value becomes a maximum.

The fourth object of the present invention is to provide an auto focus control device in an auto focus mechanism of the contrast method type by detecting a high frequency part to judge a peak of an evaluative value correctly in the case that the focus lens is being moved when the evaluative value achieves a peak.

SUMMARY OF THE INVENTION

To accomplish the first object of the invention, the present invention is characterized in that an auto focus control device comprises a means for judging whether the picture is taken against the light sometimes (i.e. is taken in "counter light") and a means for enlarging a zone for measuring focal distance compared to the ordinary zone for measuring focal distance in the case of taking a picture against the light.

To accomplish the second object of the invention, the present invention is characterized in that an auto focus control device comprises a means for detecting the brightness of an object, a means for comparing the brightness of an object when an evaluative value is maximum versus the brightness of the object at another time, and a means for judging a detected peak of an evaluative value as a valuable when the difference of the compared values is within a reference level and for judging the detected peak of the evaluative value as not valuable when the difference of the compared values is more than the reference level.

To accomplish the third object of the invention, the present invention is characterized in that an auto focus control device comprises a detecting means for detecting a high frequency part of a signal passed through an automatic gain control circuit and means for reducing the gain value of the detecting means in accordance with the gain value of the automatic gain control circuit.

To accomplish the fourth object of the invention, the present invention is characterized in that an auto focus control device comprises a means for changing a reference value in order to judge whether a displacement of an evaluative value is valuable or not valuable in accordance with the opening degree of an iris, the gain value of an automatic gain control circuit or the gain value of an amplifier circuit.

With respect to the first object of the invention, a zone for measuring distance is enlarged where the contrast ratio is relatively high in the case of the photographing against the light. Thus, the sensitivity for judging contrast ratio is increased and incorrect focusing can be prevented.

With respect to the second object of the invention, the detected brightness is compared with the brightness when the evaluative value is at the peak and a brightness at a moment when the evaluative value is not at the peak, for example, when the evaluative value is at the minimum. If the difference of the brightness becomes large, the detected brightness is not recognized as the peak value and peak detection is repeated.

With respect to the third object of the invention the gain value of the amplifier is reduced corresponding to a linear, stepped or curved characteristic line of a focus position of the focus lens versus a focus distance of the zooming lens when the gain value of the automatic gain control (AGC) circuit is relatively high, so that the noise component in a high frequency part is reduced.

With respect to the fourth object of the invention, in the case that an iris is relatively closed when the gain of the AGC is relatively high or the gain of the amplifier circuit is relatively high, the noise component becomes large so that the reference value becomes high in order to judge a peak of an evaluative value accurately. On the other hand, in the case that the iris is relatively open as when the gain value of the automatic gain control circuit is relatively low or the gain value of the amplifier circuit is relatively low, the noise component becomes low in order to detect a peak rapidly without a focus lens running over a focus point.

DETAILED DESCRIPTION OF THE PREFERRED EMBODIMENTS

Figure 1:
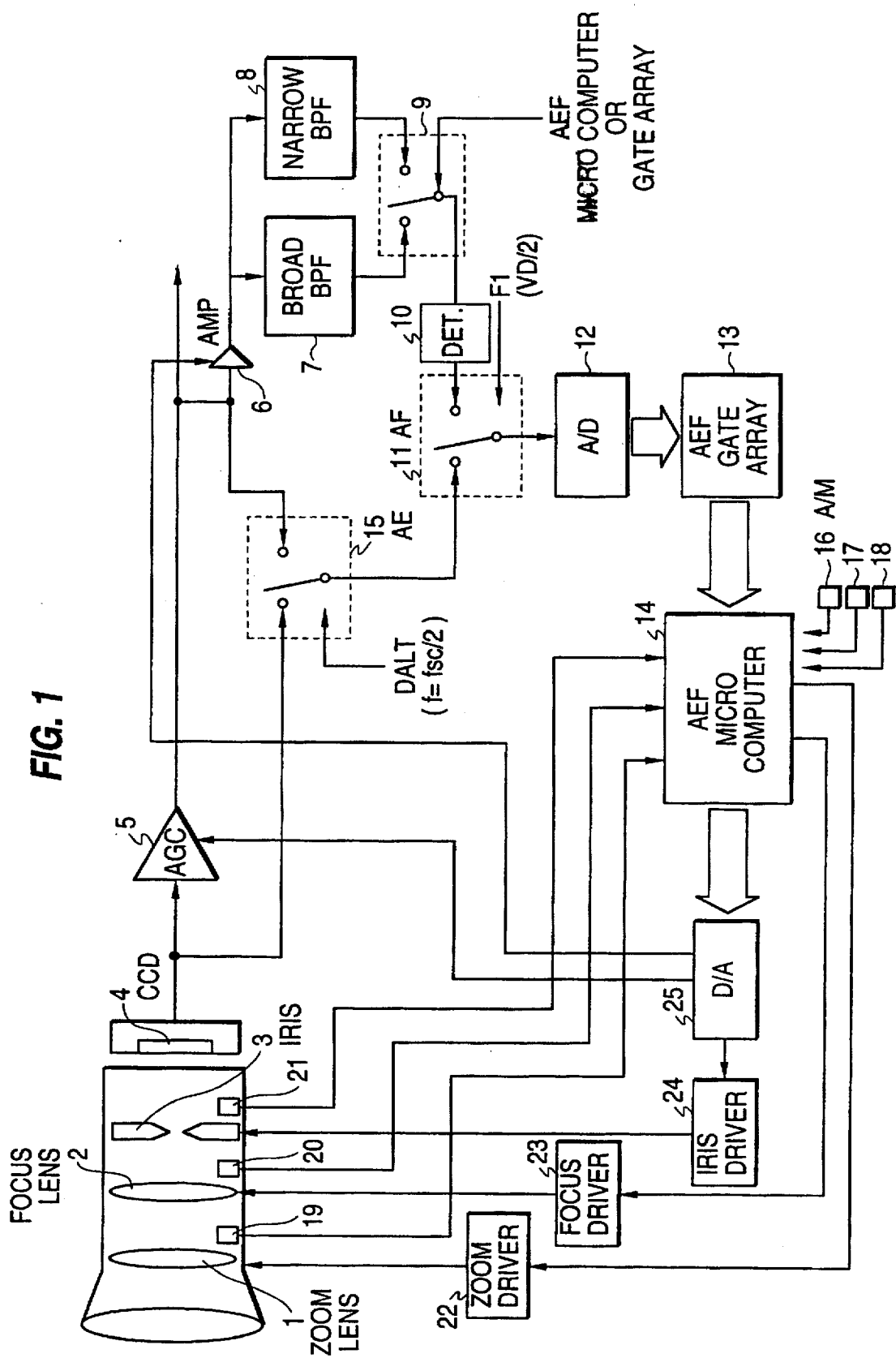
FIG. 1 shows a block diagram of a video camera with an auto focus control device according to the present invention.

One of the embodiments according to the present invention will be described with reference to FIGS. 1 through 18. FIG. 1 shows a block diagram of a video camera according to the present invention. The video camera employs an auto focus mechanism of the contrast method type by detecting a high frequency part of an image. Control of auto focus and auto exposure are operated by a common microcomputer. Further, the video camera employs a rear focus method in which a focus lens is positioned behind a zooming lens as an optical mechanism.

In FIG. 1, a picture image of an object formed by a zoom lens 1 and a focus lens 2 is input to a picture plane of a charge coupled device (CCD) 4 through an iris 3. A signal of a picture image is input from the CCD 4 to an amplifier circuit 6 through an automatic gain control circuit 5. An amplified output from the amplifier 6 is input to a broad bandpass filter 7 and a narrow bandpass filter 8. One of the signals from the bandpass filters 7 and 8 is selected by a switch 9 and input to a wave detector circuit 10. An output of the detector 10 is input to an analogue/digital (A/D) converter 12 by a switch 11 when FI is "0". A digital output signal of the A/D converter 12 is integrated for low frequency filtering by an integration gate array 13 and then an evaluative value showing a focus degree in an auto focus system is input from the integration gate array 13 to a micro computer 14. The larger a high frequency part of the output signal of the CCD 4 becomes, the greater the evaluative value becomes. The output signal of the CCD 4 and the output signal of the AGC circuit 5 are alternatively selected by a switch 15 with $f_{sc}/2$. When the FI signal is "1", the output signal is input to the A/D converter 12 by the switch 11. The digital output signal of the A/D converter 12 is integrated by the gate array 13 and then its output signal is input to the microcomputer 14 as an evaluative value regarding brightness in an auto focus system. The switch 9 is actuated in accordance with commands from the computer 14.

The switch 11 is actuated in accordance with the FI signal which is alternatively changed between "1" and "0" with VD/2. An A/M switch 16 for switching between an auto focus position and a manual position, a zoom switch 17 for actuating an electric zoom member, a volume operating member 18 in a manual focusing period, an encoder 19 for detecting a position of the zoom lens 1, a sensor 20 for detecting a home position of the focus lens 2 and a hole element 21 for detecting an opening degree (iris value) of the iris 3 are connected to the computer 14 and the outputs are input to the computer 14 for auto focus and auto exposure. The computer 14 provides a control signal to a driving means 22 for driving the zooming lens 1, a driving means 23 for driving the focus lens 2 and a driving means 24 for driving the iris 3, respectively, so that the position of the focus lens 2 and the iris 3 can be controlled. In addition, gain control signals are provided to the AGC circuit 5 and the amplifier 6 to control a gain value thereof. Item 25 is a digital/analogue (D/A) converter.

Operation of the microcomputer 14 will be described in detail with reference to FIGS. 2 through 18.

Figure 2:
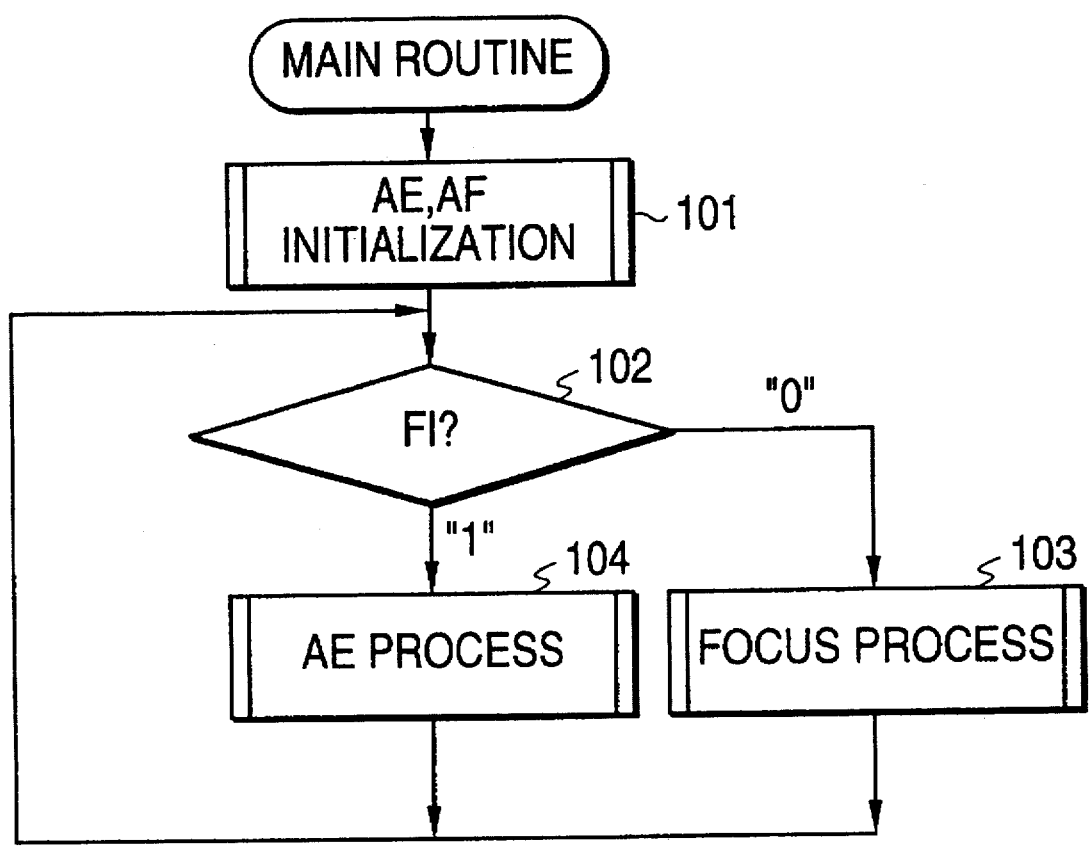
FIG. 2 shows a flow chart of a main routine.

FIG. 2 shows a main routine of the computer 14. After the computer 14 is switched on, an auto exposure system (AE) and an auto focus system (AF) are initialized in step 101. An FI signal of the switch 11 is judged to be "1" or "0" in step 102. If the FI signal is "0", an auto focus process, a manual focus process, or a zooming process including either manual or auto focus adjustment is operated in step 103. If the FI signal is "1", a judgement of whether the photographing is against the light is made by an auto exposure process. The iris 3 and the AGC circuit 5 are together controlled in step 104. These control values and input data can always be referred to in a focus routine (see FIG. 3) in the same computer The focus process of step 103 operates as shown in the flow chart of FIG. 3. In step 201, the computer 14 receives an evaluative value of focus degree based on the output of the wave detector 10 as focus data from the integral gate array 13. In the next step, A/M switch 16 judges whether the correctly selected mode is "automatic" or "manual" in step 202. If the "automatic mode" is selected, it is judged whether zoom switch 17 is OFF or ON in step 203. If zoom switch 17 is ON, it is necessary to operate the zoom process between a telescope position a wide-angle position. If the zoom switch is Off an ordinary auto focus process (see FIG. 4) is operated in step 204. In the case that focus status data FS is recognized as REKRCG or MOT-STOP at step 211, an auto focus zoom process is operated in step 205 (see FIG. 11). After finishing an ordinary auto focus step 205 (see FIG. 11). After finishing an ordinary auto focus process or an auto focus zoom process, a wave detector gain control process (see FIG. 8) and a process for controlling a zone for measuring a distance are operated, in that order, in steps 206 and 207. If an A/M switch 16 is shifted to the manual mode in the previous step 202, it is next judged whether the zoom switch 17 is ON or OFF in a step 208. If the switch 17 is ON, a manual zoom process (see FIG. 14) is operated in step 209 and then a manual focus process (see FIG. 15) is operated in step 210. If the zoom switch 17 is OFF, the manual focus process 210 is immediately operated.

Figure 4:
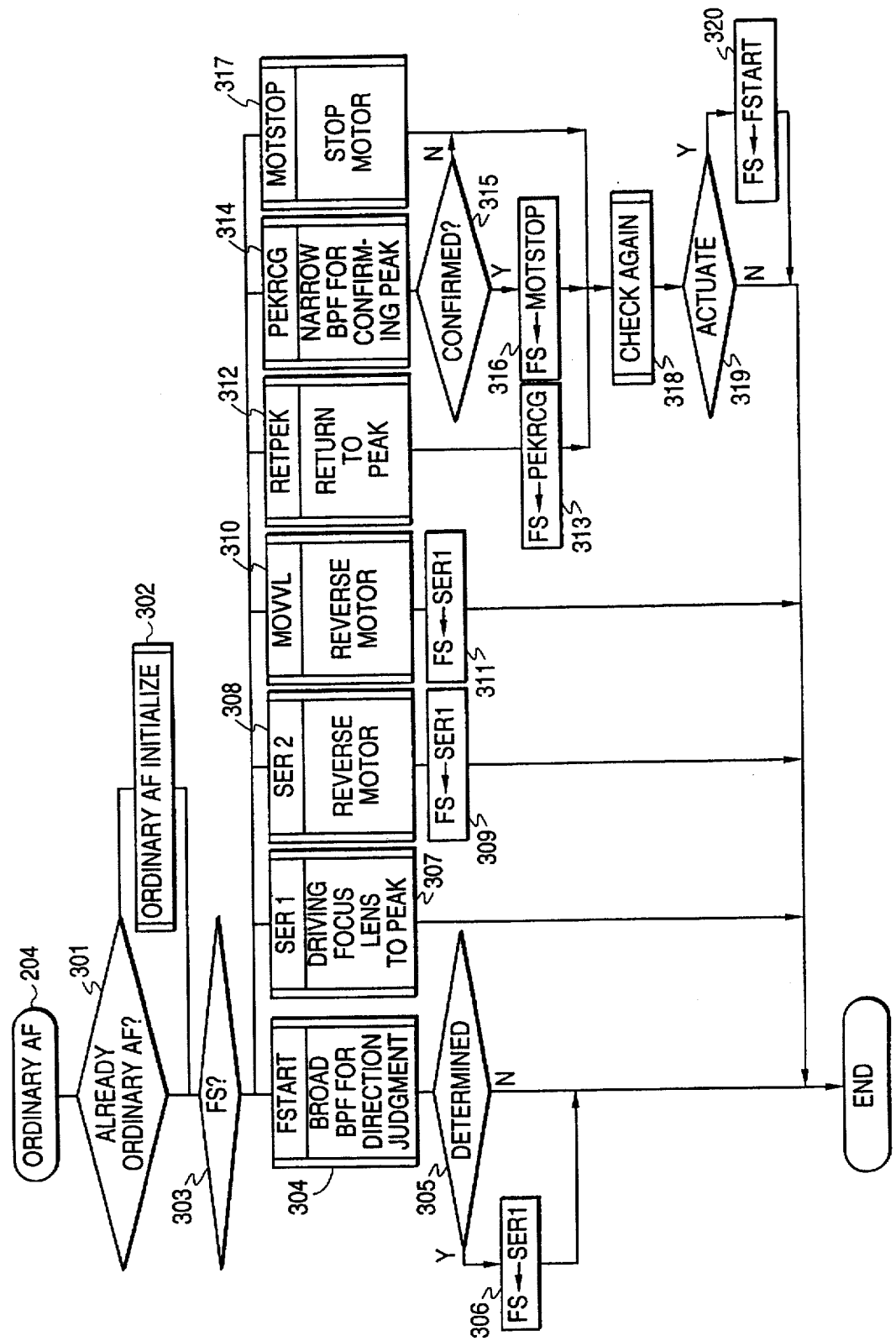
FIG. 4 shows a flow chart of an ordinary auto focus processing routine.

The ordinary auto focus process routine will be described with reference to FIGS. 4 through 7. As shown in FIG. 4, it is judged whether the last process is an ordinary auto focus process at step 301. If it is judged NO, the ordinary auto focus process is initialized in step 302. After focus status FS information is set to FSTART, the focus status information is judged. There are six other kinds of focus status, namely, SER1, SER2, MOWL, RETPEK, PEKRCG, and MOT-STOP. The auto focus process is operated depending on the focus status information.

In the case of FSTART, the micro computer 14 controls the switch 9, selects an output of the broad bandpass filter 7, actuates focus lens 2 by driver means 23 and judges a moving direction of the focus lens 2 for focusing. If the evaluative value is increased in accordance with a movement of the focus lens 2, the moving direction is a proper direction for focusing. On the contrary, if the evaluative value is decreased, the opposite direction is a proper direction for focusing. If the evaluative value does not change, a proper direction for focusing is unclear. If the moving direction of the focus lens 2 is determined in step 305, focus status information is rewritten to SER1 in step 306 and the operation returns to step 303.

Figure 5:
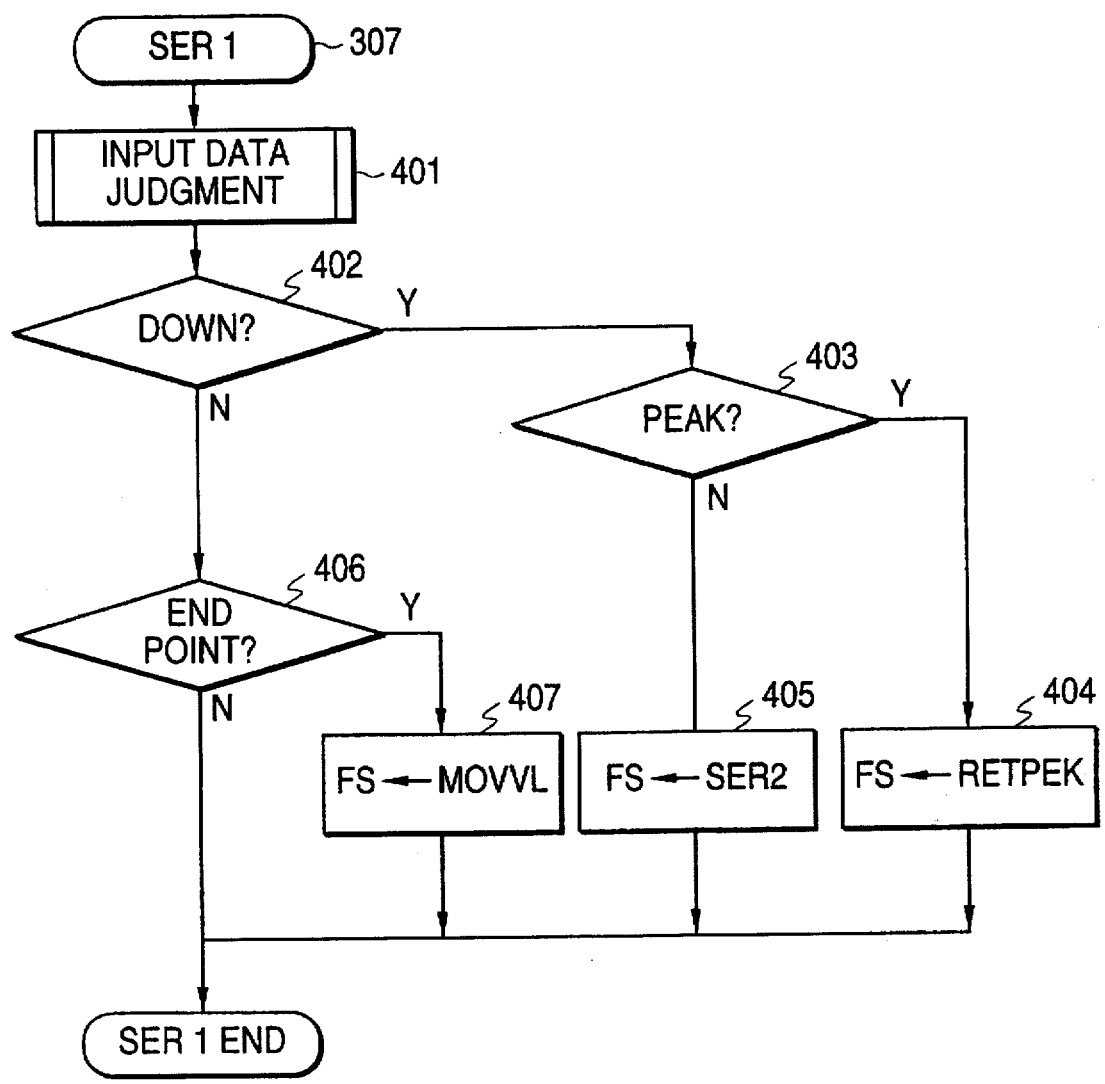
FIG. 5 shows a flow chart of the SER1 routine for detecting a peak of an evaluative value.
Figure 6:
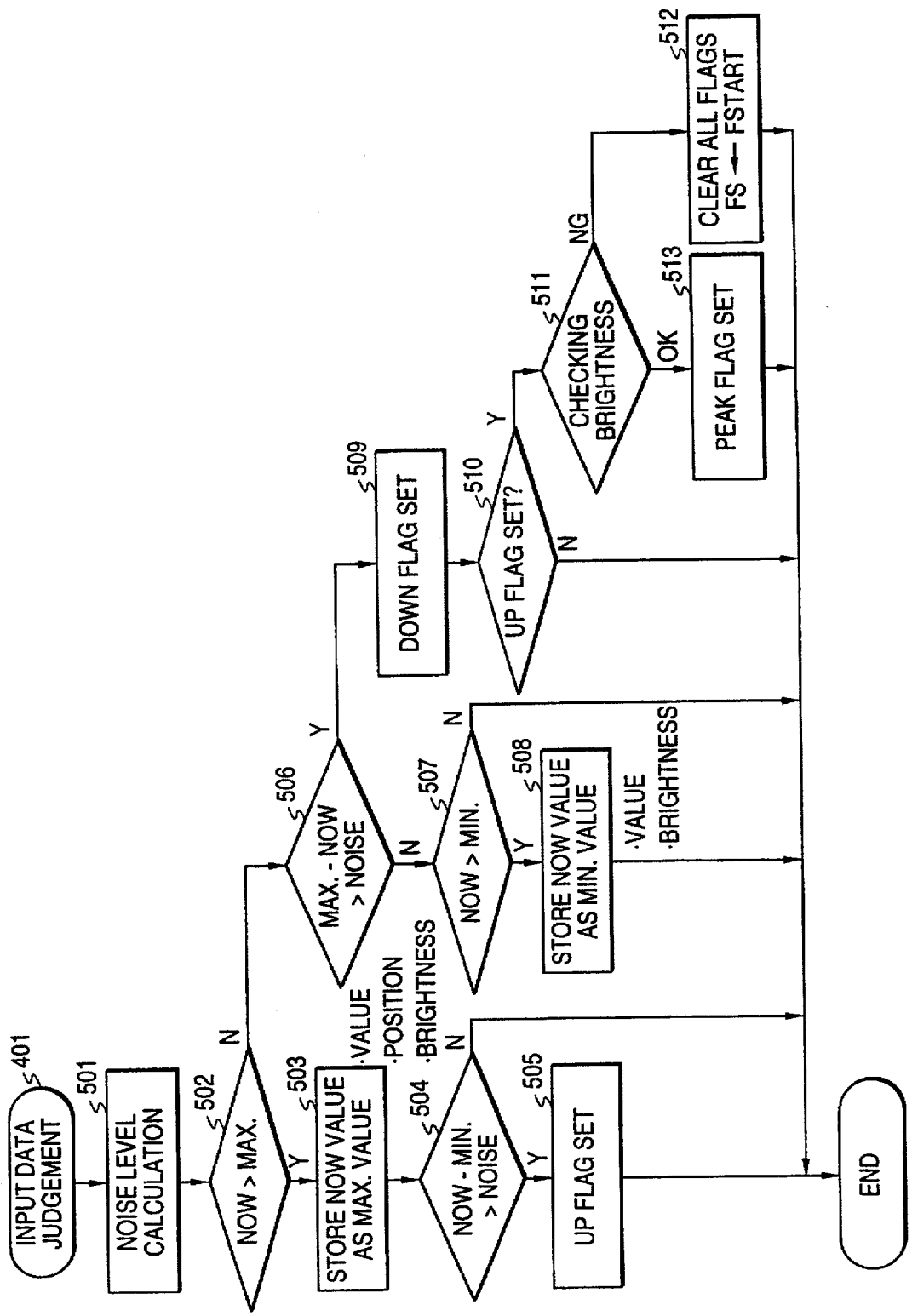
FIG. 6 is a flow chart of a routine for judging an input data.

When the focus status information is SER1, operation goes to step 307, in which the focus lens 2 is driven until a peak of the evaluative value is found. The process routine SER1 is described in detail in FIG. 5. In FIG. 5, a process of input data judgment (401) is listed. The details of this process are shown in FIG. 6, and will be described later. Next in step 402, it is judged whether the evaluative value is decreasing. If it is judged the evaluative value is decreasing it is next judged whether a peak was detected before the evaluative value began decreasing. If peak was detected focus status data is rewritten to REPEK in step 404. Unless a peak was detected, it is judged that the operation was unsuccessful and the focus status data is rewritten to RET-PEK in step 404. Unless a peak is detected, it is judged that the operation was unsuccessful and the focus status is rewritten to SER2. In the case that the evaluative value was not decreasing in the previous step 402, it is judged whether focus lens 2 has approached an end point in step 406. If it is judged that the focus lens 2 has approached an end point, it is recognized that the operation is unsuccessful and the focus status is rewritten to MOVVL in step 407.

The process routine for judging input data (step 401) will now be described with reference to FIG. 6. A noise level is calculated in a step 501. A noise component is included in the evaluative value. Unless a displacement of the evaluative value is greater than the noise level, it cannot be judged whether the evaluative value is going down or up. Therefore, it is necessary to know the noise level. Further, the noise level is influenced by the camera iris value, the gain value of the AGC circuit 5, and the gain value of the amplifier 6.

The noise level is calculated based on the above factors. If the noise level is adjusted in the case that an UP flag exists, it is preferable to judge input data. Therefore, the noise level is calculated depending on the existence of the UP flag. FIGS. 16A through 16D show functional relationships useful for calculating the noise level.

After calculating the noise level, in step 502 it is judged whether a present evaluative value is greater than the last highest value. If the present evaluative value is greater than the previous highest value, the present evaluative value is stored as the maximum value in a register in step 503. At that time, the position of focus lens 2 and the brightness of an auto exposure system are simultaneously memorized. In the next step 504, it is judged whether a difference between the present evaluative value and the last lowest value is greater than a noise level N1. If the difference is greater than the noise level N1, this means that the evaluative value is increasing and then the UP flag is set in step 505.

In the case that the present evaluative value is less than the last highest value in step 502, it is judged in step 506 whether a difference between the last highest value and the present evaluative value is greater than the noise level N1. If the difference is less than the noise level N1, it is judged in step 507 whether the present evaluative value ("Now" in the Figure) is less than the last minimum value. If so, in step 508 the present evaluation value is stored in a register as the new minimum value. A brightness of the auto exposure system at the time is also memorized.

In the case that the difference between the highest value and the present evaluative value is greater than noise level N1, this means that the evaluative value is going down. In step 509, a DOWN flag is set. In the next step 510, it is judged whether the UP flag has already been set. If the UP flag has already been set, it is recognized that a peak of the evaluative value has occurred. However, the peak of the evaluative value may be due to the brightness of the object field changing during an operation. To avoid such wrong judgement, the brightness of the object field at a peak time is detected at step 511. A brightness of the auto focus exposure system at a moment when an evaluative value becomes the maximum value is much greater than a value at a moment when the evaluative value becomes the minimum value. For example, if a ratio thereof is equal to or more than 120%, the UP flag and the DOWN flag are cleared and the focus status data is rewritten to FSTART. If the ratio is not so high, it is recognized that the peak of the evaluative value has occurred and a peak flag is set in step 513.

The brightness calculation of the auto exposure system will now be explained. The micro computer 14 calculates a brightness of an object based on the degree of opening of the iris 3 and the gain value of AGC circuit 5. That is, the higher the brightness of an object becomes, the more the iris 3 is closed. The lower the brightness of an object becomes, the more the iris 3 is opened. If the iris 3 is released and then the brightness of an object becomes dark, the gain of the AGC circuit 5 becomes higher. When an electric shutter is actuated, an opening degree of the iris 3 is increased and the gain of the AGC circuit 5 becomes higher, while the shutter speed becomes faster. The brightness of an object can be calculated by the computer 14 from these factors.

In the case that the focus status information is SER2, a motor for driving the focus lens 2 is reversely driven in step 308 as shown in FIG. 4. The focus status data is rewritten in step 309. As shown in FIG. 5, the steps 401, 402, 403 and 405 are operated in order as per the flow chart of SER1 process routine. If a peak of the evaluative value cannot be found, it is necessary to reversely drive the focus lens 2 in order to find the peak of the evaluative value in the SER1 process routine.

In the case that the focus status data is MOVVL, the situation is similar to SER2. That is, the motor for driving the focus lens 2 is reversely driven in step 310 as shown in FIG. 4. The focus status is rewritten to SER1 in the next step, 311. As shown in FIG. 5, steps 401, 402, 406 and 407 are performed in order as per the flow chart. The focus lens 2 approaches the end point while the evaluative value is not going down so that it is necessary to reversely drive the focus lens 2 in order to find a peak of the evaluative value in the SER1 routine.

In the case that the focus status becomes RETPEK by finding the peak at step 403 in FIG. 5, focus lens 2 is returned to a position where the evaluative value was maximum in step 312 of FIG. 4. The focus status FS is rewritten to PEKRCG in step 313 and it is checked to actuate the motor for driving the focus lens 2 again at step 318. If step 319 judges that it is necessary to actuate the motor again (this step will be described later), the focus status data is rewritten to FSTART at step 320.

Figure 7:
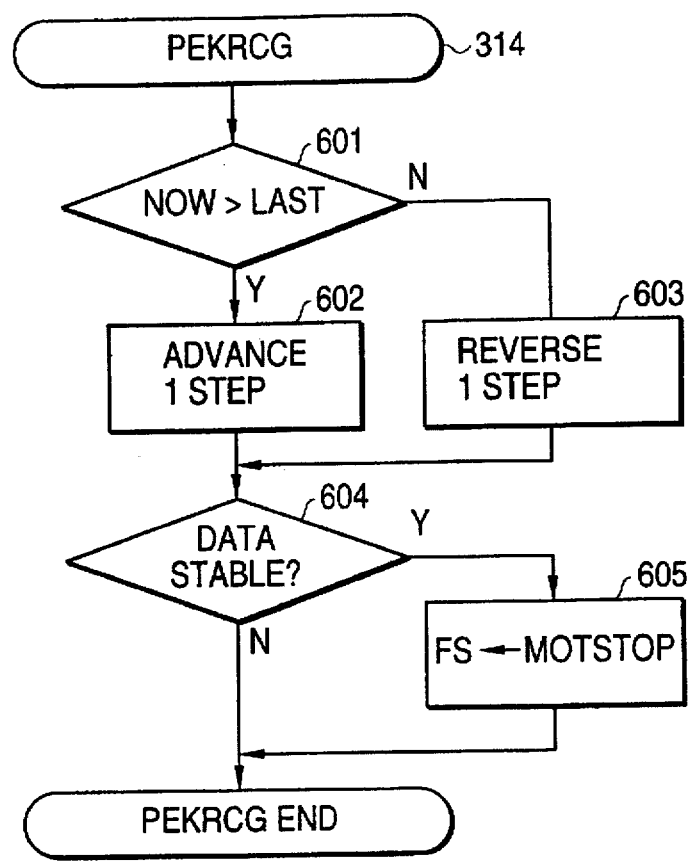
FIG. 7 is a flow chart of the PEKRCG routine for confirming a peak of an evaluative value.

In the case that the focus status data is PEKRCG, an output of the narrow bandpass filter 8 is selected by controlling the switch 9 in step 314 (FIG. 4) in order to confirm the peak of the evaluative value. The PEKRCG routine is shown in FIG. 7 in detail. Initially, the present evaluative value is compared with the previous value in a step 601. If the present value ("NOW" in the Figure) is greater than the previous value ("LAST" in the Figure), a position of the focus lens 2 is advanced one step at step 602. If the previous value is greater than the present value, the position of the focus lens 2 is reversed one step in step 603. In a step 604, it is judged whether the data is stable by judging whether the evaluative value corresponding to the position of the focus lens 2 advanced forwardly/backwardly some steps is within a specified noise level ($-N2/+N2$). If the data is stable within a predetermined period, it is recognized that the focus lens 2 is located at a point where the evaluative value becomes the peak and the focus status data FS is rewritten to MOTSTOP in step 605.

After finishing the PEKRCG process, it is judged whether a confirmation of the peak of the evaluative value is finished at step 315 in FIG. 4. If the confirmation is finished, the focus status FS is rewritten to MOTSTOP in step 316 and then the operation goes to step 318 for checking the actuation of the motor again in step 318. Unless the confirmation is finished, the operation goes to the step directly for checking the actuation of the motor again.

In the case that the focus status is MOTSTOP, a motion of the focus lens 2 is stopped by stopping the motor and then the operation goes to the step 318.

Figure 17:
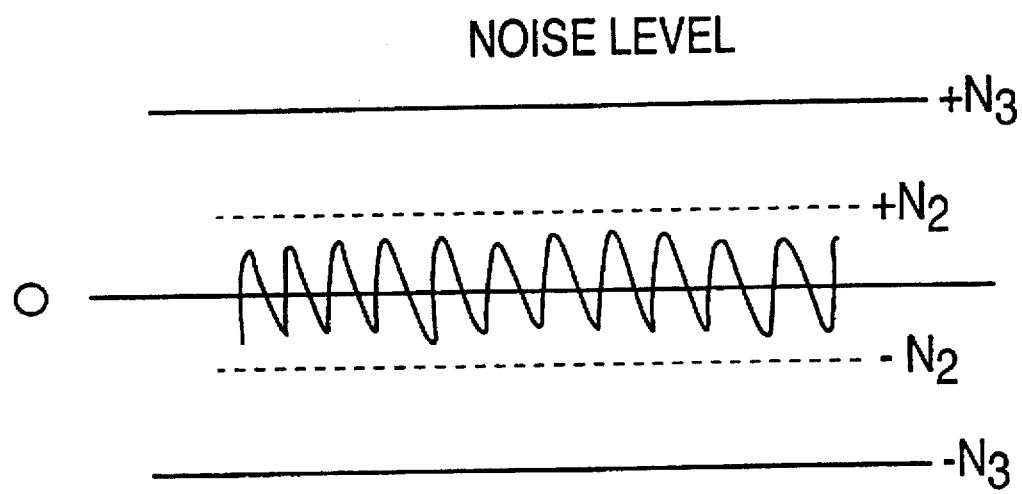
FIG. 17 shows various noise levels.

In the step 318 for checking an actuation of the motor again, the following process is performed. It is judged whether the evaluative value at a focus position is changed more than a predetermined level ($-N3/+N3$). If the displacement displace amount is more than the level $-N3/+N3$, it is judged that focusing is not proper and it is concluded to repeat the auto focus process from the first at step 319 and the focus status FS is rewritten to FSTART. As shown in FIG. 17, (206 in FIG. 3) N3 is greater than N2.

Figure 8:
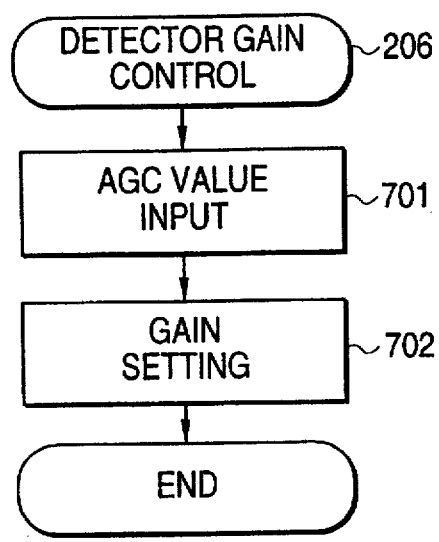
FIG. 8 is a flow chart of a processing routine for controlling the gain of an amplifier circuit.
Figure 18:
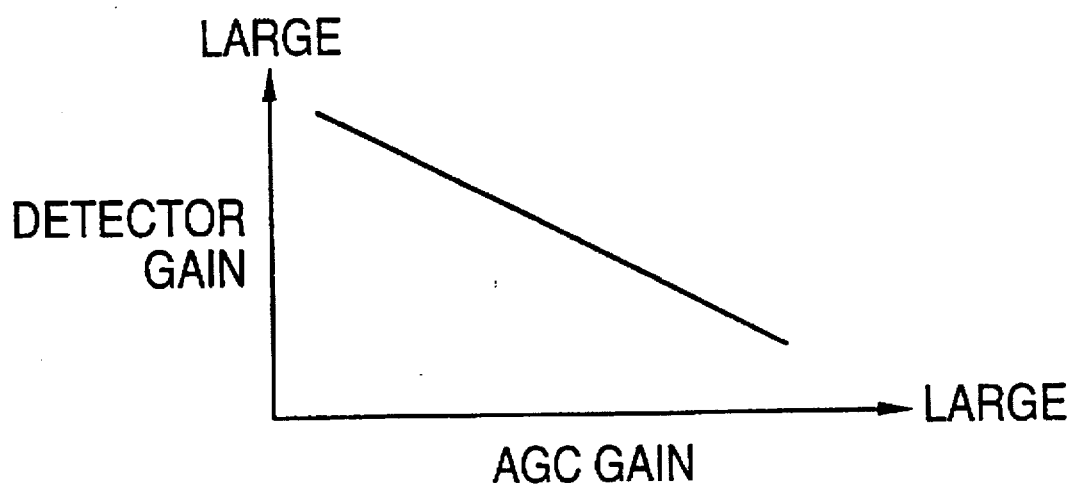
FIG. 18 shows a characteristic gain curve of an amplifier.

Next, the process for controlling a gain value of the wave detector 10 will be described in detail with reference to FIGS. 8 and 18. A gain value of the AGC 5 is input at step 701. Corresponding to the gain value, a gain value of the amplifier 6 is determined in step 702 from a relation, for example, as shown in FIG. 18 for reducing noise in the entire system when the gain value of the AGC 5 is relatively high.

Figure 9:
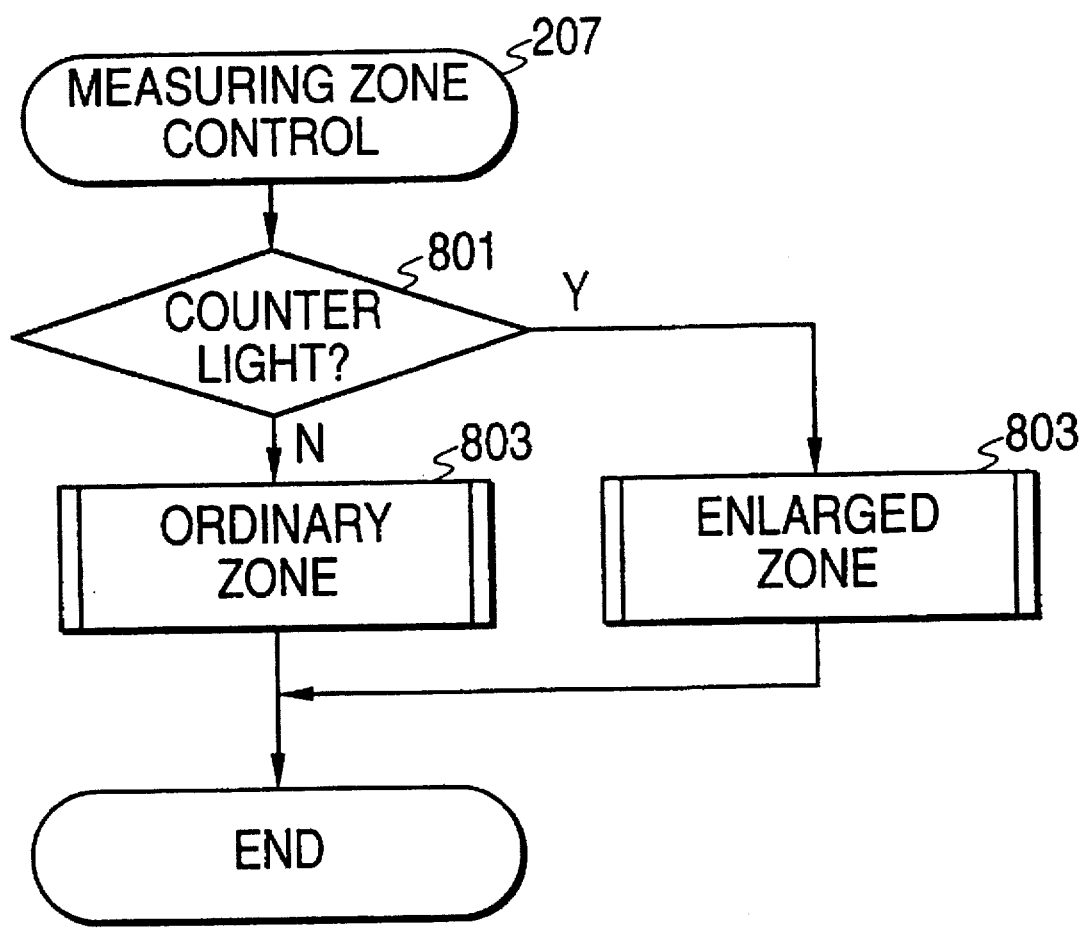
FIG. 9 is a flow chart of a processing routine for controlling a zone for measuring a distance.
Figure 10A:
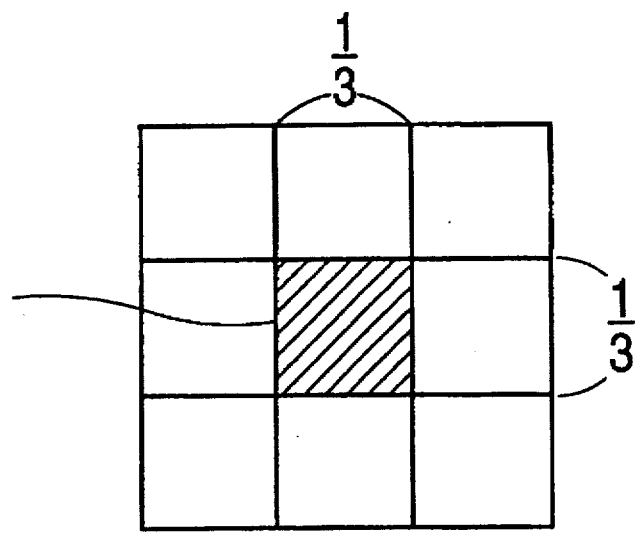
FIG. 10 shows one example of a zone for measuring distance.
Figure 10B:
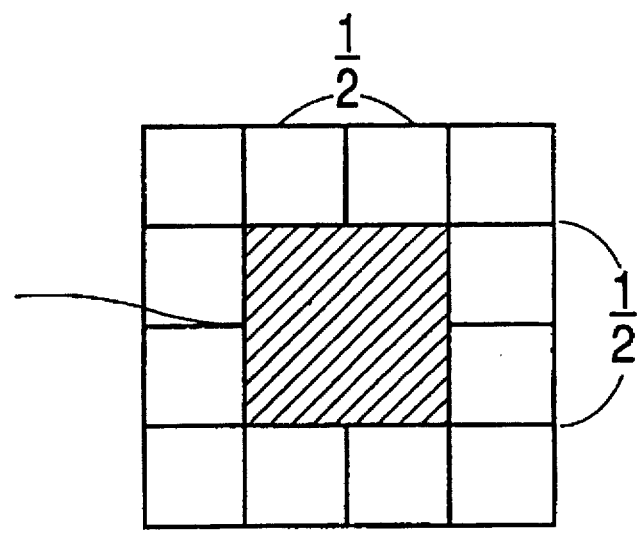

Next, the process for controlling a zone for measuring a distance (step 207 in FIG. 3) will be described in detail with reference to FIGS. 9 and 10. At step 801 in FIG. 9 it is determined if the picture is being taken against the light (i.e. in "counter light") from information of an auto exposure system. If not in counter light, an ordinary zone for measuring a distance having ⅓ the length and ⅓ the width of a picture plane is provided at a center portion as shown in FIG. 10A in a step 802 and a focus process is operated based on a signal from the zone. If the picture is being taken in counter light, an enlarged zone for measuring a distance having ½ the length and ½ the width of a picture plane is provided at a center portion, as shown in FIG. 10B.

Figure 3:
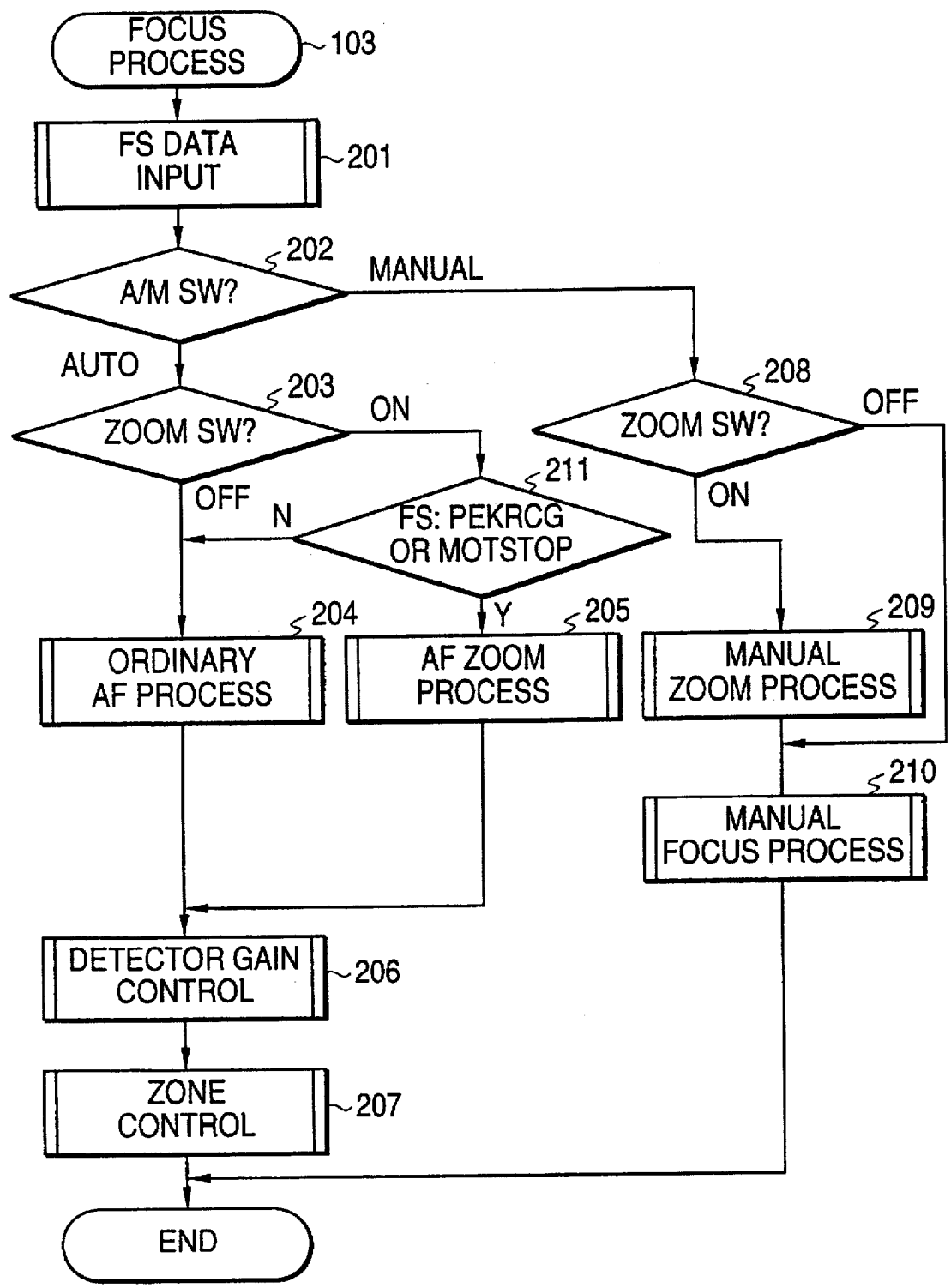
FIG. 3 shows a flow chart of a focus processing routine.
Figure 12:
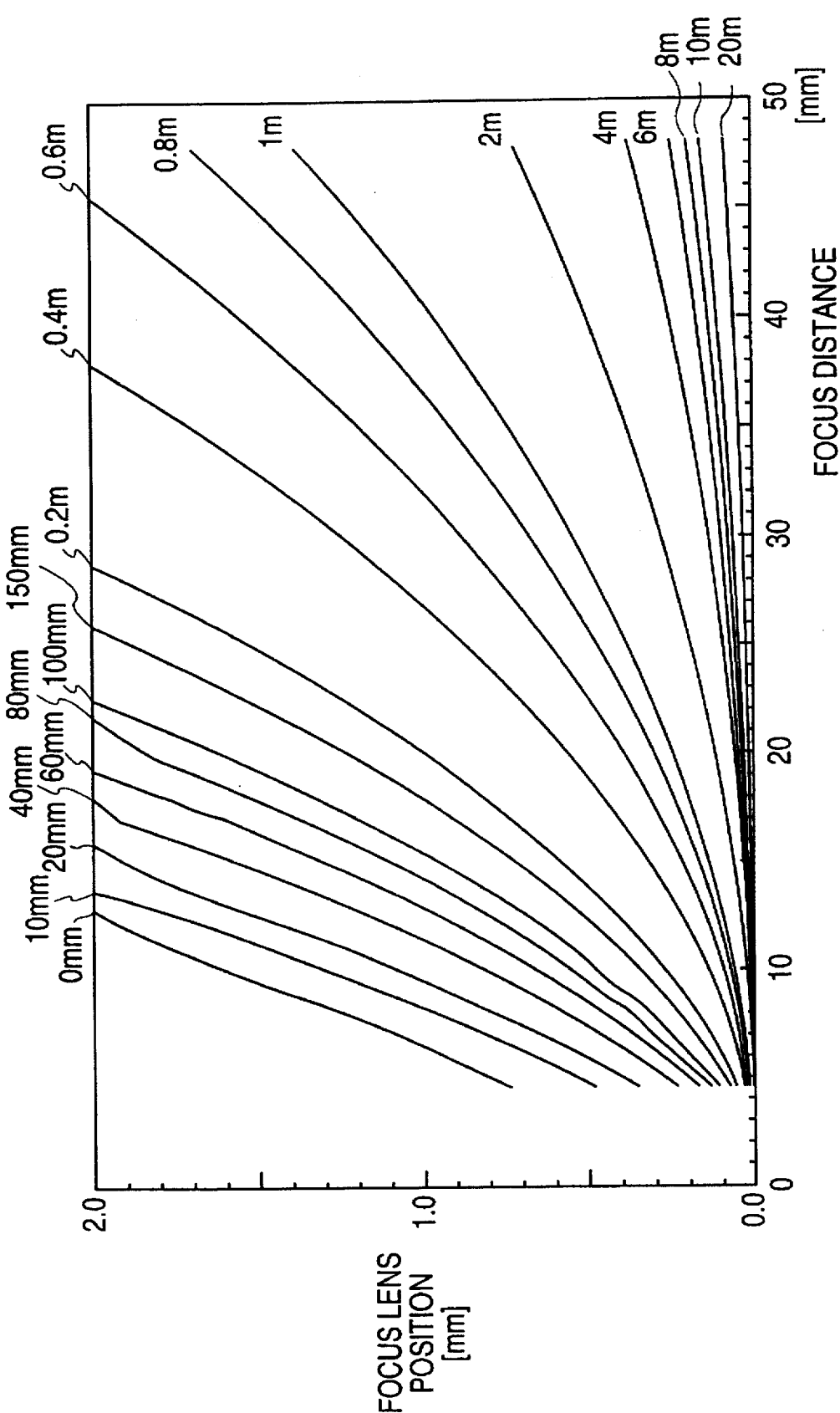
FIG. 12 shows a relation between a focus distance and a focus position of a focus lens.
Figure 13:
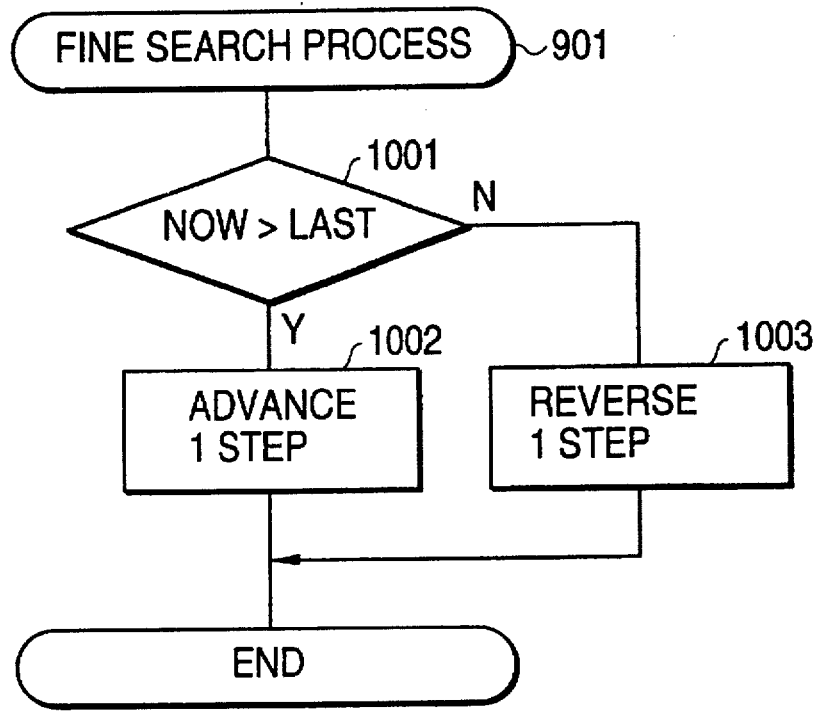
FIG. 13 shows a flow chart of a process routine for fine adjustment search.

Next the auto focus zoom process (step 205 as shown in FIG. 3) will be described in detail with reference to FIGS. 11 through 13. The focus is matched at step 211, and a differential value of an auto focus zoom tracking is calculated at step 901 in FIG. 11. In the auto focus zoom process, as shown in FIG. 12, the relationship between the focus distance of the zoom lens 1 and the position of the focus lens 2 is previously known with the distance between the camera and an object as a parameter. It is necessary to displace the position of the focus lens 2 along a parameter characteristic curve corresponding to the movement of the zooming lens 1 by memorizing a function or a table of the relationship. It is better to switch the position of the focus lens a differential amount in accordance with a displacement of the focus lens position with respect to a change of a focus distance, that is, a differential value. The differential value may be detected from its characteristic line as shown in FIG. 12. However, a differential line most closely matches an original characteristic line in a rear focus optical system according to the present invention; that is, the original characteristic line is an exponential function so that differential value is obtained by multiplying the position of the focus lens by a coefficient corresponding to the distance between an object and the camera.

In step 902, it is judged whether the differential value is greater than the predetermined value. If the differential value is less than the predetermined value, a process of fine adjustment search is performed in step 903. In the process for a fine adjustment search, as shown in FIG. 13, a position of the focus lens is advanced one step. Initially, the evaluative value at the present focusing time is compared with the previous evaluative value in step 1001. If the present evaluative value is greater than the previous value, the position of the focus lens is further advanced one step along the same direction in step 1002. If the present value is less than the previous value, the position of the focus lens is advanced one step along the opposite direction in step 1003.

Figure 11:
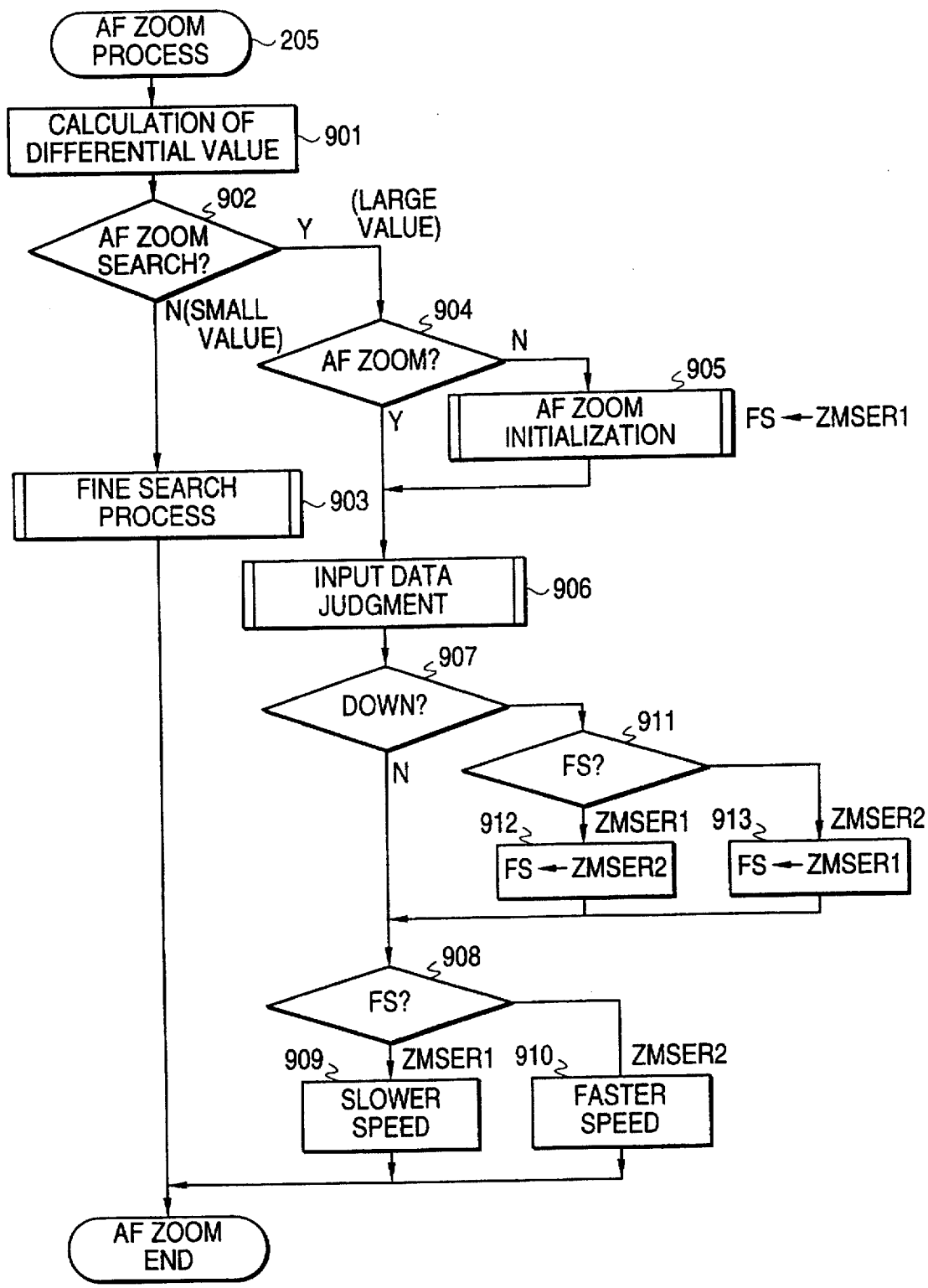
FIG. 11 shows a flow chart of an auto focus zoom processing routine.

On the other hand, in the case that the differential value is greater in step 902 as shown in FIG. 11, it is judged whether the camera was in the auto focus zoom process at the previous time in step 905. If not, the auto focus zooming process is initialized at step 905. After the focus status FS is written as ZMSER1, the operation goes to step 906.

Step 906 is a process judging input data. It is a similar in content to step 401 in the SER1 routine shown in FIG. 5. It is operated in the same process for judging input data as described in FIG. 6. In step 907 it is judged whether the evaluative value at a focusing position is going up or down from a result of the process for judging the input data. Unless the evaluative value is going down, it is judged whether a focus status data is ZMSER1 or ZMSER2 in step 908. If the focus status is ZMSER1 in 908, the position of the focus lens 2 is moved with a speed slower than the differential value at step 909. If the focus status is ZMSER2, the position of the focus lens 2 is moved with a speed faster than the differential value at step 910. However, in the case that the evaluative value is judged to be going down at step 907, the focus status is judged at step 911. If the focus status is ZMSER1, the focus status is rewritten to ZMSER 2. If the focus status is ZMSER2, the status is rewritten to ZMSER1 at step 913. Next, the operation goes to step 908 and the position of the focus lens is moved in step 909 or step 910.

Figure 14:
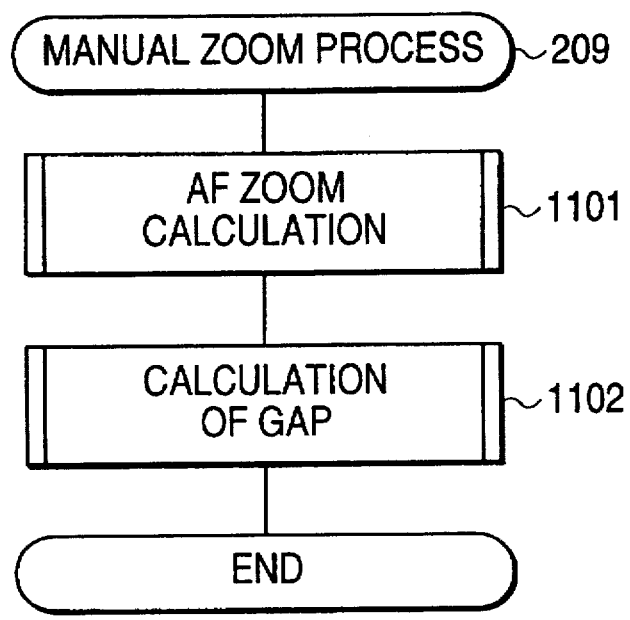
FIG. 14 shows a flow chart of a manual zoom process routine.
Figure 15:
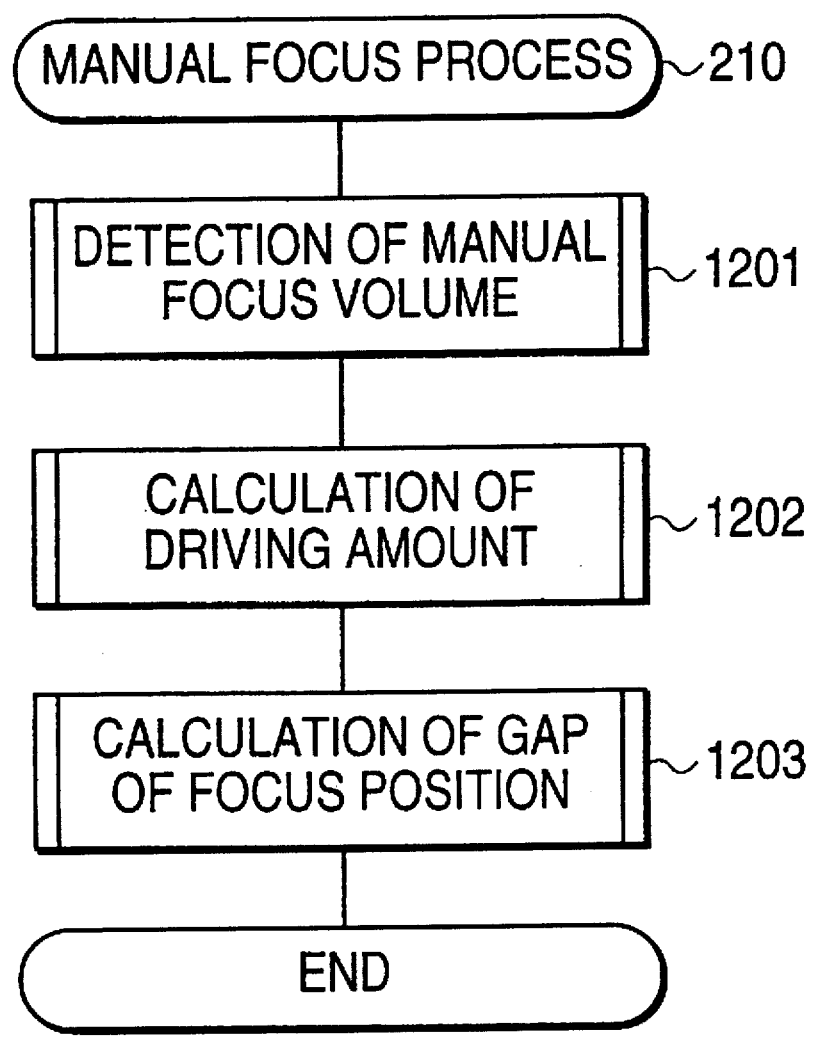
FIG. 15 shows a flow chart of a manual focus process routine.
Figure 16A:
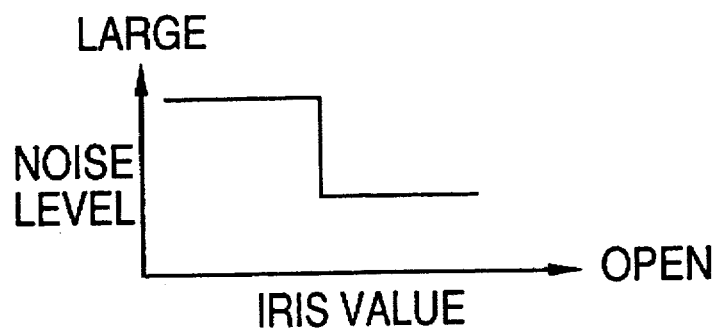
FIGS. 16A through 16D show the functional relationship between noise level and the other parameters, respectively.
Figure 16B:
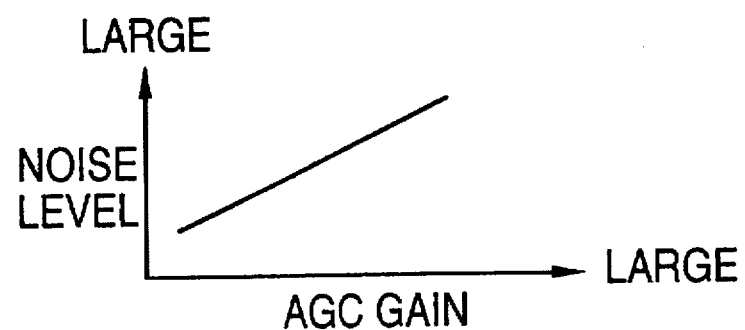
Figure 16C:
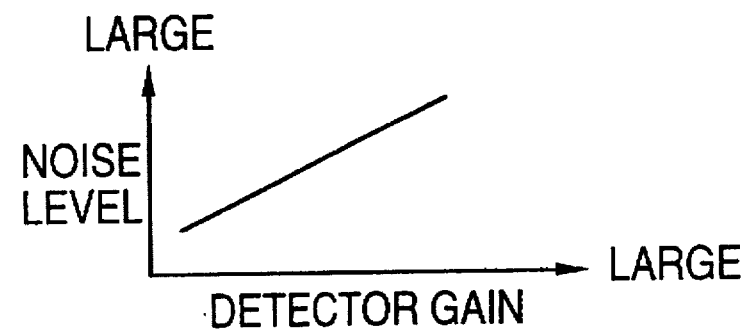
Figure 16D:
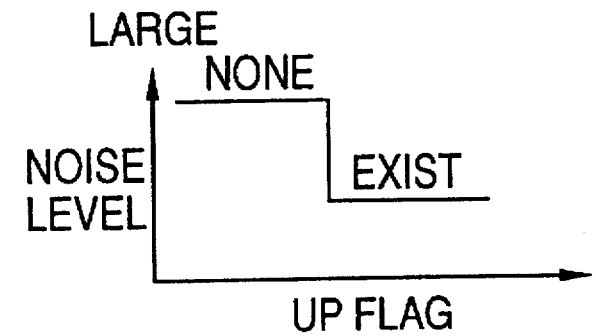

Next, the manual zoom process of step 209 and the manual focus process of step 210 in FIG. 3 will be described with respect to FIGS. 14 and 15. As shown in FIG. 14, an auto focus zoom tracking is calculated at step 1101 initially at the manual zoom process as shown in FIG. 14. A position of the focus lens corresponding to the zoom position is calculated in accordance with the relation between focus distance and position of the focus lens versus the distance between an object and the camera as a parameter as shown in FIG. 12. A gap between an actual position of the focus lens and a calculated position of the focus lens is calculated. On the other hand, as shown in FIG. 15, in a manual focus process, the operation amount of a manual focus volume 18 is detected at step 1201 initially. A driving amount of the focus lens corresponding to the operation amount is calculated at step 1202. At step 1203, focus lens 2 is moved corresponding to the gap of the position of the focus lens calculated in step 1102 for the manual zoom process and the driving amount of the position of the focus lens is calculated in step 1202 for a manual focus process.

As described above, an auto focus control device according to the present invention can be prevented from improperly focusing in counter light by providing an enlarged zone for measuring the distance.

In accordance with the present invention, a brightness of an object at a moment when an evaluative value becomes peak and a brightness of an object at another moment are compared. If the brightness of an object at a moment when an evaluative value becomes peak is changed very much, such a peak is not recognized as a real peak. Therefore, a judgement of a peak of a evaluative value is not influenced by a brightness of an object so that the judgement is operated correctly.

In accordance with the present invention, a reference value for judging a displacement of an evaluative value can be changed corresponding to the opening degree of an iris, a gain value of an AGC circuit, or a gain value of a wave detector circuit, so that over run of a focus lens can be reduced in a period for detecting a peak of an evaluative value and the incorrect judging of a detected peak is avoided.

I claim:

1. An auto focus control device comprising:
   means for determining if a photographing direction of a video camera is against the light;
   means for providing, on a picture plane of said video camera, a zone for measuring a distance between said video camera and an object;
   means for providing an enlarged zone for measuring said distance when said means for determining determines said photographing direction to be against the light, wherein said enlarged zone is larger than said zone;

means for detecting an evaluative value for focusing, by detecting a high frequency part of a picture image signal in said enlarged zone when said means for determining determines said photographing direction to be against the light, and by detecting a high frequency part of a picture image signal in said zone when said means for determining does not determine said photographing direction to be against the light;

means for moving a focus lens based on an evaluative value for focusing detected by said means for detecting in a zone provided in accordance with said photographing direction;

means for judging, for each moving of said focus lens, if an evaluative value for focusing at a current point after moving of said focus lens exceeds, by a predetermined reference value, an evaluative value for focusing at a previous point before moving of said focus lens; and means for positioning said focus lens so that said evaluative value for focusing becomes a maximum, based on a result of said judgment with respect to the increase of an evaluative value for focusing.

2. An auto focus control device claimed in claim 1, further comprising:

means for detecting a brightness of the object, wherein said brightness is different from said evaluative value for focusing;

means for detecting the difference in brightness of the object when said evaluative value for focusing is a maximum versus the brightness of said object when said evaluative value for focusing is a minimum;

means for deciding if said detected difference in brightness is not within a predetermined level; and means for restarting an auto focus process when said means for deciding decides said detected difference in brightness to be not within said predetermined level, wherein said means for positioning holds said focus lens at a point where said evaluative value for focusing becomes a maximum when said means for judging determines said detected difference in brightness to be within said predetermined level.

3. An auto focus control device claimed in claim 1, further comprising:

an automatic gain control circuit for inputting a picture image signal from a photographing unit of said camera;

an amplifier for further amplifying a picture image signal from said automatic gain control circuit, wherein said means for detecting detects said evaluative value for focusing from a picture image signal amplified by said amplifier; and means for reducing a gain of said amplifier, depending on a gain of said automatic gain control circuit.

4. An auto focus control device claimed in claim 1, further comprising:

means for varying said reference value used for said judgement with respect to the increase of said evaluative value for focusing, depending on an opening degree of an iris.

5. An auto focus control device claimed in claim 1, further comprising:

an automatic gain control circuit for inputting a picture image signal from a photographing unit of said camera, wherein said means for detecting detects said evaluative value for focusing from a picture image signal amplified by said automatic gain control circuit; and means for varying said reference value used for said judgment with respect to the increase of said evaluative value for focusing, depending on a gain of said automatic gain control circuit.

6. An auto focus control device claimed in claim 1, further comprising:

an automatic gain control circuit for inputting a picture image signal from a photographing unit of said camera;

an amplifier for further amplifying a picture image signal from said automatic gain control circuit, wherein said means for detecting detects said evaluative value for focusing from a picture image signal amplified by said amplifier; and means for varying said reference-value used for said judgment with respect to the increase of said evaluative value for focusing, depending on a gain of said amplifier.

7. An auto focus control device claimed in claim 1, wherein said means for determining includes performing multi-divided light measurement.

8. An auto focus control device claimed in claim 7, further comprising:

an automatic gain control circuit for inputting a picture image signal from a photographing unit of said camera;

an amplifier for further amplifying a picture image signal from said automatic gain control circuit, wherein said means for detecting detects said evaluative value for focusing from a picture image signal amplified by said amplifier;

means for reducing a gain of said amplifier, depending on a gain of said automatic gain control circuit;

means for varying said reference value used for said judgment with respect to the increase of said evaluative value for focusing, depending on an opening degree of an iris, the gain of said automatic gain control circuit, and the gain of said amplifier;

means for detecting a brightness of the object, wherein said brightness is different from said evaluative value for focusing;

means for detecting the difference in brightness of the object when said evaluative value for focusing is a maximum versus the brightness of said object when said evaluative value for focusing is a minimum;

means for deciding if said detected difference in brightness is not within a predetermined level; and means for restarting an auto focus process when said means for deciding decides said detected difference in brightness to be not within said predetermined level, wherein said means for positioning holds said focus lens at a point where said evaluative value for focusing becomes a maximum when said means for judging determines said detected difference in brightness to be within said predetermined level.

9. An auto focus control method comprising the steps of:

determining if a photographing direction of a video camera is against the light;

providing, on a picture plane of said video camera, a zone for measuring a distance between said video camera and an object;

providing an enlarged zone for measuring said distance when said determining step determines said photographing direction to be against the light, wherein said enlarged zone is larger than said zone;

detecting an evaluative value for focusing, by detecting a high frequency part of a picture image signal in said enlarged zone when said determining step determines said photographing direction to be against the light, and by detecting a high frequency part of a picture image signal in said zone when said determining step does not determine said photographing direction to be against the light;

moving a focus lens based on an evaluative value for focusing detected by said detecting step in a zone provided in accordance with said photographing direction;

judging, for each moving of said focus lens, if an evaluative value for focusing at a current point after moving of said focus lens exceeds, by a predetermined reference value, an evaluative value for focusing at a previous point before moving of said focus lens; and positioning said focus lens so that said evaluative value for focusing becomes a maximum, based on a result of said judging step.

10. An auto focus control method claimed in claim 9, further comprising:

detecting a brightness of the object, wherein said brightness is different from said evaluative value for focusing;

detecting a difference in a brightness of the object when said evaluative value for focusing is a maximum and a brightness of said object when said evaluative value for focusing is a minimum;

deciding if said detected difference in brightness is not within a predetermined level; and restarting an auto focus process when said deciding step determines said detected difference in brightness to be not within said predetermined level, wherein said positioning step maintains said focus lens at a point where said evaluative value for focusing becomes a maximum when said deciding step determines said detected difference in brightness to be within said predetermined level.

11. Art auto focus control method claimed in claim 9, further comprising:

inputting a picture image signal from a photographing unit of said camera via an automatic gain control circuit;

further amplifying a picture image signal from said automatic gain control circuit, wherein said detecting step detects said evaluative value for focusing from a picture image signal amplified by said amplifying step; and reducing a gain of said amplifying step, depending on a gain of said automatic gain control circuit.

12. An auto focus control method claimed in claim 9, further comprising:

varying said reference value used for said judging step with respect to the increase of said evaluative value for focusing, depending on an opening degree of an iris.

13. An auto focus control method claimed in claim 9, further comprising:

inputting a picture image signal from a photographing unit of said camera via an automatic gain control circuit, wherein said detecting step detects said evaluative value for focusing from a picture image signal amplified by said automatic gain control circuit; and varying said reference value used for said judging step with respect to the increase of said evaluative value for focusing, depending on a gain of said automatic gain control circuit.

14. An auto focus control method claimed in claim 9, further comprising:

inputting a picture image signal from a photographing unit of said camera via an automatic gain control circuit;

further amplifying a picture image signal from said automatic gain control circuit, wherein said detecting step detects said evaluative value for focusing from a picture image signal amplified by said amplifier; and varying said reference value used for said judging step with respect to the increase of said evaluative value for focusing, depending on a gain of said amplifying step.

15. An auto focus control method claimed in claim 9, wherein said determining step includes performing multi-divided light measurement.

16. An auto focus control device claimed in claim 15, further comprising:

inputting a picture image signal from a photographing unit of said camera via an automatic gain control circuit;

further amplifying a picture image signal from said automatic gain control circuit, wherein said detecting step detects said evaluative value for focusing from a picture image signal amplified by said further amplifying step;

reducing a gain of said further amplifying step, depending on a gain of said automatic gain control circuit;

varying said reference value used for said judging step with respect to the increase of said-evaluative value for focusing, depending on at least one of an opening degree of an iris, the gain of said automatic gain control circuit, and the gain of said amplifier;

detecting a brightness of the object, wherein said brightness is different from said evaluative value for focusing;

detecting a difference in brightness of the object when said evaluative value for focusing is a maximum and the brightness of said object when said evaluative value for focusing is a minimum;

deciding if said detected difference in brightness is not within a predetermined level; and restarting an auto focus process when said deciding step determines said detected difference in brightness to be not within said predetermined level, wherein said positioning step maintains said focus lens at a point where said evaluative value for focusing becomes a maximum when said deciding step determines said detected difference in brightness to be within said predetermined level.

* * * * *